(12) United States Patent
Tsuboi et al.

(10) Patent No.: US 9,463,832 B2
(45) Date of Patent: Oct. 11, 2016

(54) SPOILER UNIT AND MANUFACTURING METHOD THEREOF

(71) Applicant: AISIN SEIKI KABUSHIKI KAISHA, Kariya-shi, Aichi-ken (JP)

(72) Inventors: Kazuki Tsuboi, Kariya (JP); Kenji Hori, Toyota (JP); Yoshimasa Asano, Kariya (JP); Tokuhiro Shiga, Anjo (JP); Shuhei Uchida, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/800,148

(22) Filed: Jul. 15, 2015

(65) Prior Publication Data

US 2016/0039478 A1     Feb. 11, 2016

(30) Foreign Application Priority Data

Aug. 8, 2014   (JP) .................................. 2014-161992

(51) Int. Cl.
  *B62D 35/00*     (2006.01)
  *B62D 65/16*     (2006.01)

(52) U.S. Cl.
  CPC ............. *B62D 35/007* (2013.01); *B62D 65/16* (2013.01)

(58) Field of Classification Search
  CPC ............................ B62D 35/00; B62D 35/007
  USPC ............................................ 296/180.1, 180.5
  See application file for complete search history.

(56) References Cited

U.S. PATENT DOCUMENTS

| | | | | |
|---|---|---|---|---|
| 4,887,681 A * | 12/1989 | Durm | ..................... | B60K 11/08 180/68.1 |
| 5,141,281 A * | 8/1992 | Eger | ..................... | B62D 35/007 296/180.5 |
| 5,165,751 A * | 11/1992 | Matsumoto | .......... | B62D 35/007 296/180.5 |
| 6,030,028 A * | 2/2000 | Radmanic | ............ | B62D 35/007 296/146.16 |
| 7,641,262 B2 * | 1/2010 | Nusbaum | ............. | B62D 35/001 296/180.5 |
| 2007/0145776 A1 * | 6/2007 | Grave | ................. | B62D 35/007 296/180.5 |
| 2007/0236045 A1 * | 10/2007 | Froeschle | ............ | B62D 35/007 296/180.5 |
| 2009/0295191 A1 * | 12/2009 | Fidan | ....................... | B60J 7/223 296/180.5 |
| 2010/0032982 A1 * | 2/2010 | Browne | ................. | B62D 35/00 296/180.5 |
| 2014/0021742 A1 * | 1/2014 | Durm | ................... | B62D 35/007 296/180.5 |
| 2014/0175831 A1 * | 6/2014 | Hoelzel | ................ | B62D 35/005 296/180.5 |
| 2016/0039478 A1 * | 2/2016 | Tsuboi | ................... | B62D 65/16 296/180.1 |
| 2016/0046334 A1 * | 2/2016 | Jeong | ..................... | F16H 37/14 296/180.5 |
| 2016/0059911 A1 * | 3/2016 | Shiga | ................... | B62D 35/007 296/180.5 |

FOREIGN PATENT DOCUMENTS

DE     102011081899 A1     2/2013

* cited by examiner

*Primary Examiner* — Gregory Blankenship
(74) *Attorney, Agent, or Firm* — Finnegan, Henderson, Farabow, Garrett & Dunner, LLP

(57) ABSTRACT

A spoiler unit includes a movable spoiler for a vehicle, a frame fixing the movable spoiler to the vehicle, and a cover being mounted on the frame.

8 Claims, 9 Drawing Sheets

SPOILER UNIT AND MANUFACTURING METHOD THEREOF

CROSS REFERENCE TO RELATED APPLICATIONS

This application is based on and claims priority under 35 U.S.C. §119 to Japanese Patent Application 2014-161992, filed on Aug. 8, 2014, the entire content of which is incorporated herein by reference.

TECHNICAL FIELD

This disclosure generally relates to a spoiler unit and a manufacturing method thereof.

BACKGROUND DISCUSSION

A known drive unit that deploys and retracts a spoiler for a vehicle is disclosed in DE102011081899A (hereinafter referred to as Patent reference 1). The drive unit includes a motor and an output of the motor is connected to connection components (four-bar linkage mechanisms) that are positioned at the right and the left of the vehicle via a spindle mechanism, respectively. The spoiler is fixed to the four-bar linkage mechanisms and is movable between a deployed position and a retracted position.

According to the construction of the drive unit, extraneous materials, for example, liquid may enter into an inner side of the frame when the spoiler is deployed. For example, during high-pressure vehicle washing, a drive shaft that connects the four-bar linkage mechanisms and the motor may get wet with a high-pressure washing liquid.

A need thus exists for a spoiler unit and a manufacturing method thereof which are not susceptible to the drawback mentioned above.

SUMMARY

According to an aspect of this disclosure, a spoiler unit includes a movable spoiler for a vehicle, a frame fixing the movable spoiler to the vehicle and a cover being mounted on the frame.

According to another aspect of this disclosure, a manufacturing method of a spoiler unit, the spoiler unit including a movable spoiler for a vehicle and a frame fixing the movable spoiler to the vehicle includes steps of preparing a cover that includes a circumferential rim portion, the circumferential rim portion having flexibility, the cover including a separation portion that is connected to a lower surface of the circumferential rim portion, mounting the cover on the frame, and flexing the circumferential rim portion upwardly by separating the separation portion from the circumferential rim portion while pulling up the separation portion along an outer circumference of the cover.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Examples of embodiments of this disclosure will hereunder be explained in detail with reference to the drawings. For example, sizes, materials, shapes and relative positions of components of this disclosure are desirably changed in accordance with the construction of a device that employs this disclosure and in accordance with various conditions. According to this specification, up and down correspond to an up direction and a down direction, respectively, in a gravity direction. A front side corresponds to a side where a driver seat of a vehicle is provided and a rear side corresponds to a direction opposite to the front side.

Figure 1:
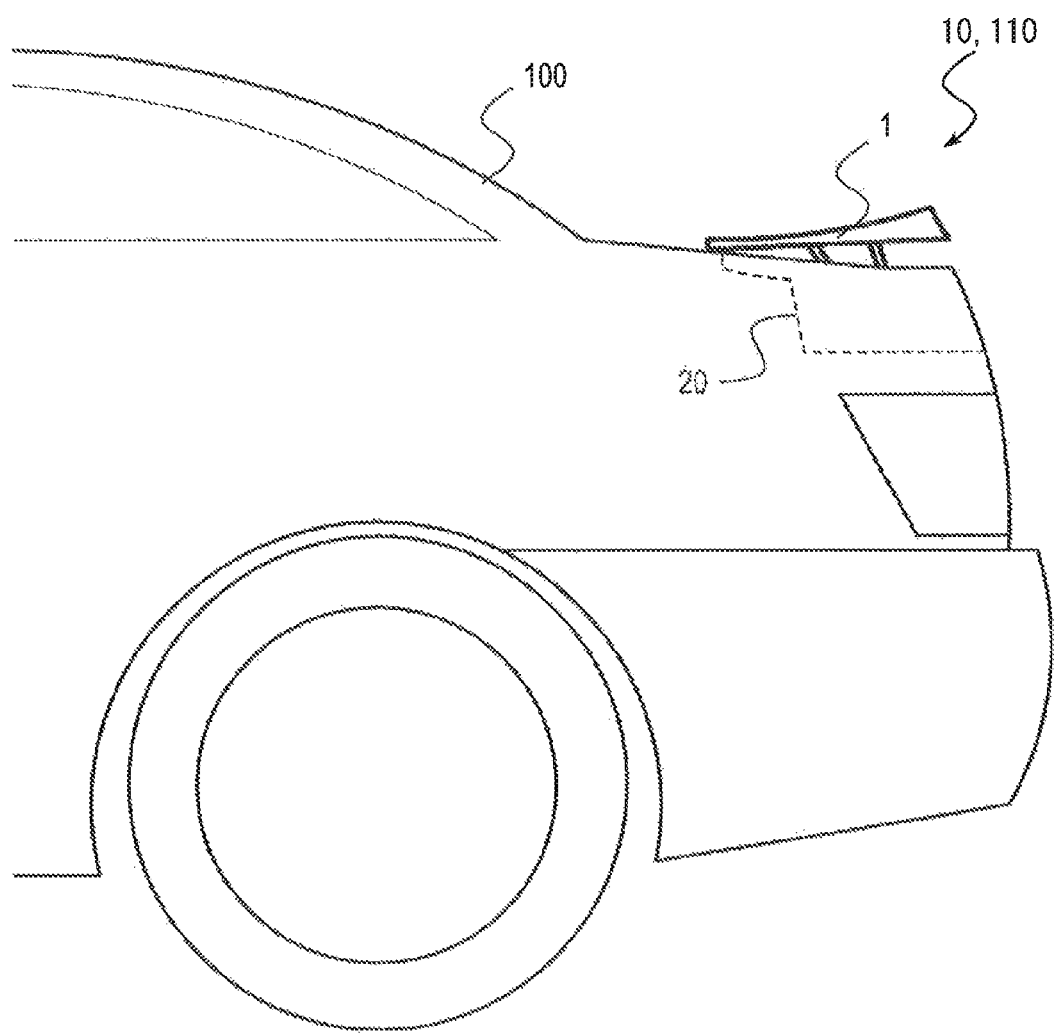
FIG. 1 is a side view schematically illustrating a spoiler unit that is mounted to a vehicle according to embodiments disclosed here.
Figure 2:
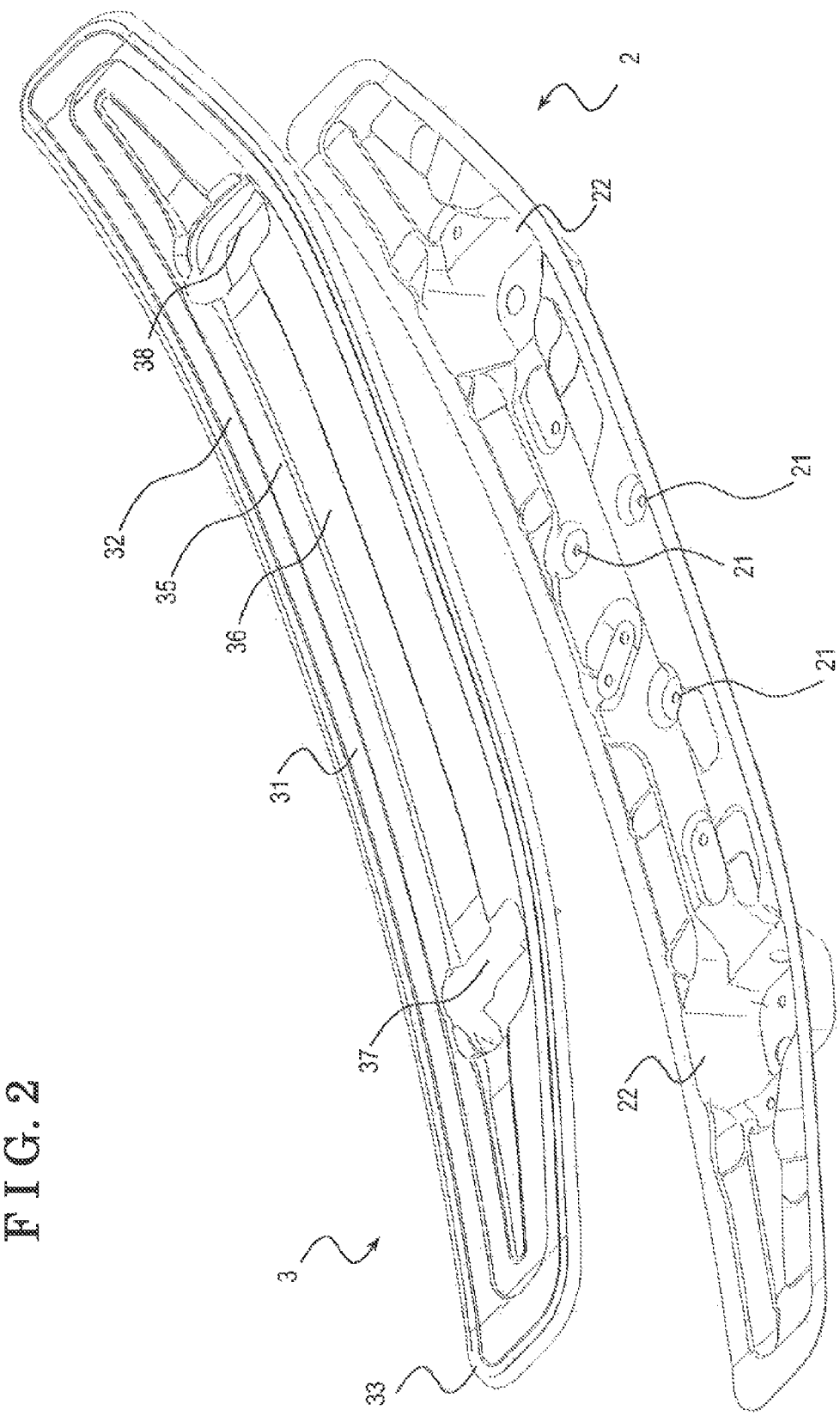
FIG. 2 is a perspective view schematically illustrating a frame and a cover.

A first embodiment of this disclosure will hereunder be explained. FIG. 1 is a side view schematically illustrating a spoiler unit 10 that is mounted on a rear of a vehicle 100 and illustrating a movable spoiler 1 that is in a deployed position. FIG. 2 is a perspective view schematically illustrating a frame 2 and a cover 3 that are in a separate state.

The spoiler unit 10 includes a spoiler device that is provided with the movable spoiler 1 for the vehicle 100 and an actuator 4 that moves the movable spoiler 1 being in the retracted position to the deployed position. The spoiler unit 10 includes the frame 2 and the cover 3. The frame 2 fixes the movable spoiler 1 to the vehicle 100. The cover 3 is mounted on the frame 2.

The movable spoiler 1 extends in a vehicle width direction of the vehicle 100 and is retracted in a housing portion 20 provided at the rear of the vehicle 100. The movable spoiler 1 moves upwardly by the actuator 4 from the retracted position (retracted state) where the movable spoiler 1 is retracted in the housing portion 20 to the deployed position (deployed state) as shown in FIG. 1. The actuator 4 includes a pair of link mechanisms 41 that support the movable spoiler 1. In FIG. 1, the housing portion 20 is illustrated with a dotted line.

The frame 2 is made from, for example, an iron plate or a steel plate and is fixed to a trunk lid (the housing portion 20) that is positioned at the rear of a body of the vehicle 100 by, for example, a weld bolt. The frame 2 is positioned between the movable spoiler 1 and the body of the vehicle 100 when the movable spoiler 1 is in the retracted state. An upper surface of the movable spoiler 1 is formed to be substantially continuously provided with, or flush with an upper surface of the rear of the body of the vehicle 100 when the movable spoiler 1 is in the retracted position in order to make the movable spoiler 1 be less conspicuous when the movable spoiler 1 is in the retracted state.

As shown in FIG. 2, in a state where the cover 3 is mounted on the frame 2, the cover 3 is provided in a size and a shape that cover at least one portion of the frame 2 from above the frame 2. The cover 3 that is mounted on the frame 2 includes a body portion 31. The body portion 31 is provided with an external shape that is similar to an external shape of the frame 2 and is provided in a size that is slightly larger than the frame 2. The body portion 31 is made of resin that has stiffness or rigidity. The body portion 31 covers plural holes 21 provided at the frame 2, the plural holes 21 that are, for example, bolt holes for fixing the frame to the body of the vehicle 100. Thus, because the holes 21 are not exposed to an outside when the movable spoiler 1 is in the deployed state, the designability of vehicle 100 is enhanced.

A first step portion 35 is provided at an inner side of a circumferential rim end 32 (FIG. 4) of the body portion 31 and extends in a longitudinal direction along the circumferential rim end 32. A second step portion 36 is provided at an inner side of the first step portion 35 and extends in the longitudinal direction. The second step portion 36 is formed in a substantially quadrilateral shape. The first step portion 35 is formed in a shape that surrounds the second step portion 36. The first step portion 35 is disposed lower than the circumferential rim end 32. The second step portion 36 is disposed lower than the first step portion 35. Accordingly, the cover 3 includes three steps (the circumferential rim end 32, the first step portion 35 and the second step portion 36) extending in the longitudinal direction of the movable spoiler 1.

As such, because the cover 3 includes the first and second step portions 35, 36, the stiffness or the rigidity of the cover 3 is enhanced. Thus, the cover 3 is prevented from being deformed due to, for example, wind or oscillation of the vehicle 100. Thus, the cover 3 prevents, for example, the possibility that the deformed cover 3 comes in contact with the frame 2. Further, in a case where an operator contacts the cover 3, the cover 3 is prevented from being deformed.

Meanwhile, the second step portion 36 serves as a storage portion where a bottom surface of the movable spoiler 1 is stored. Thus, an inner surface of the second step portion 36 is provided in a shape that is complementary with the bottom surface of the movable spoiler 1. Accordingly, the movable spoiler 1 can move to the retracted position without being disturbed by the cover 3.

Figure 3:
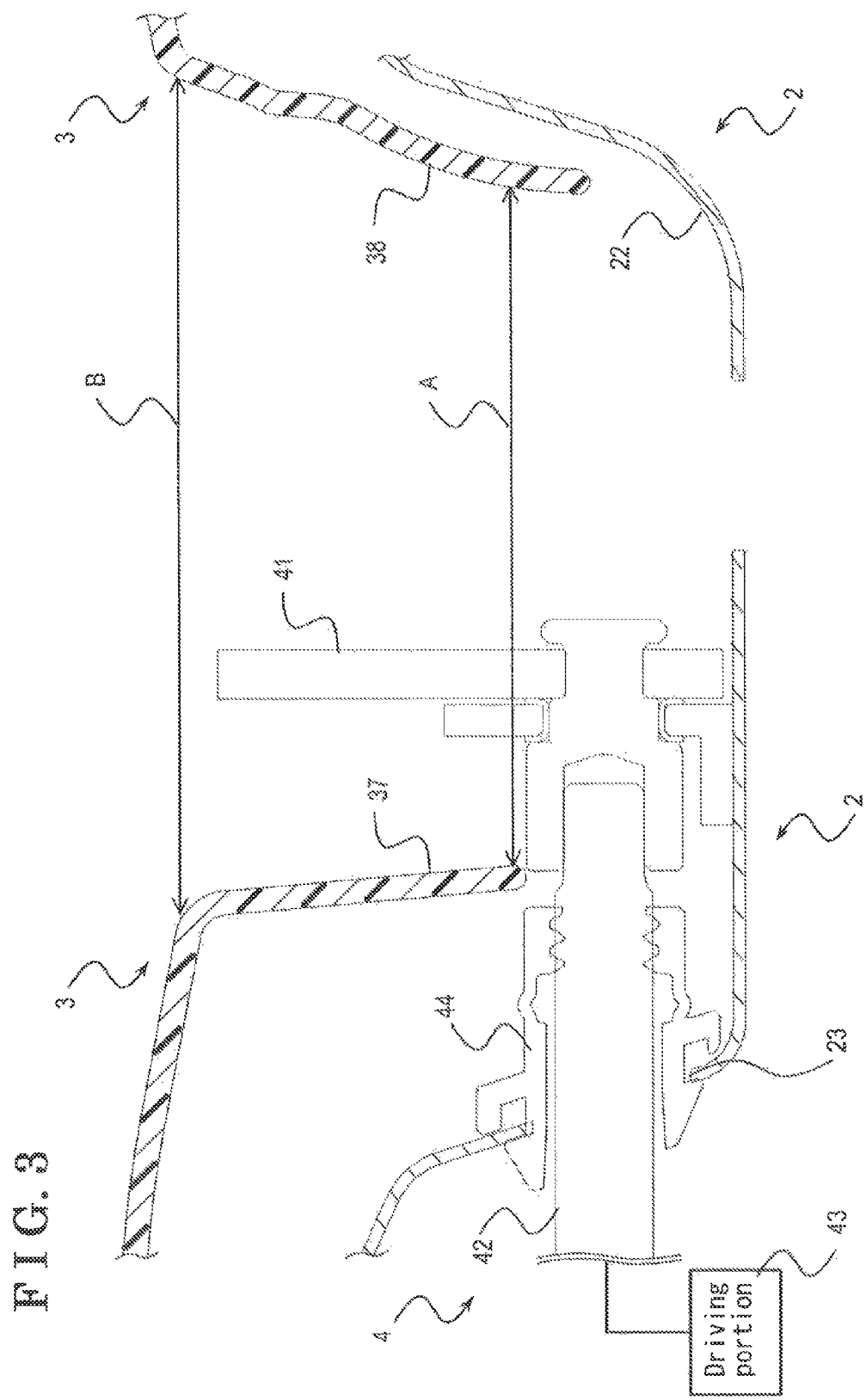
FIG. 3 is a cross-sectional view schematically illustrating a portion that serves as a recessed portion of the frame.

Next, extended portions of the cover 3 will be explained with reference to FIG. 3. FIG. 3 shows a state where the cover 3 is mounted on the frame 2 and shows a cross section of a portion serving as a recessed portion 22 of the frame 2 along the longitudinal direction.

The actuator 4 that drives the movable spoiler 1 includes the link mechanisms 41, a rod 42 connected to the link mechanisms 41, and a driving portion 43 (a motor) that drives the rod 42. When the driving portion 43 rotates the rod 42, the movable spoiler 1 moves between the retracted position and the deployed position via the link mechanisms 41. For example, an oil pressure pump can serve as the driving portion 43. The frame 2 includes the recessed portions 22 for housing the link mechanisms 41. The link mechanisms 41 are fixed on bottom surfaces of the recessed portions 22, respectively. The frame 2 is provided with a through hole 23 into which the rod 42 is inserted to be positioned through the through hole 23. The through hole 23 is formed at an inner wall of the recessed portion 22 in a lateral direction orthogonal to an up-down direction, the inner wall of the recessed portion 22 provided in the vehicle width direction.

The body portion 31 of the cover 3 includes an internal extended portion 37 (i.e., serving as an extended portion) that extends to an inner side of the recessed portion 22, The internal extended portion 37 extends downwardly so as to be positioned above the through hole 23. Accordingly, the internal extended portion 37 is positioned over the through hole 23 to cover the through hole 23, the through hole 23 into which the rod 42 is inserted to be positioned through the through hole 23. Thus, the internal extended portion 37 prevents, for example, liquid from entering into the through hole 23 during high-pressure vehicle washing.

The body portion 31 includes an external extended portion 38 (i.e., serving as an extended portion) that faces the internal extended portion 37 and that extends downwardly. The internal and external extended portions 37, 38 are inserted into the recessed portion 22 of the frame 2 when the cover 3 is mounted on the frame 2. The internal and external extended portions 37, 38 are provided so as to be positioned on a border portion of the first and second step portions 35, 36.

A rod 42 is formed with threaded grooves. A liquid seal member 44 being made of, for example, rubber, is positioned at a clearance between the rod 42 and the through hole 23. The liquid seal member 44 is engaged with the rod 42 and prevents extraneous materials, for example, liquid from entering.

An opening portion is provided between the internal and external extended portions 37, 38 that are spaced apart from each other. The internal extended portion 37 is tilted or inclined downwardly in a direction to be close to the external extended portion 38. The external extended portion 38 is tilted or inclined downwardly in a direction to be close to the internal extended portion 37. Accordingly, a distance A between respective lower portions of the internal and external extended portions 37, 38 is shorter than a distance B between respective upper portions of the internal and external extended portions 37, 38. Because the size of the opening portion provided at the body portion 31 of the cover 3 is reduced, the operator can be prevented from inserting, for example, his/her finger into the opening portion by mistake.

Figure 4:
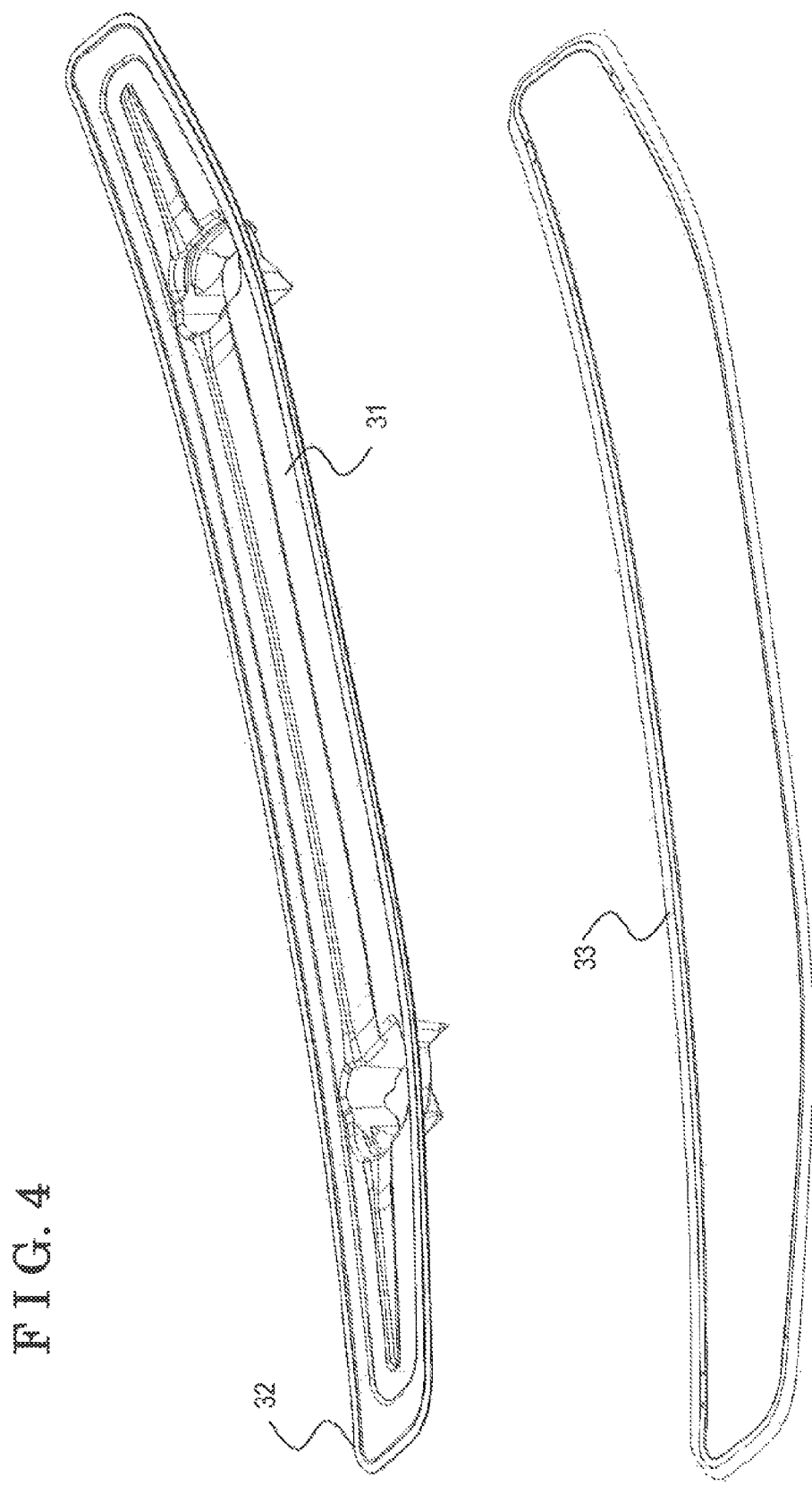
FIG. 4 is a perspective view schematically illustrating a body portion and a circumferential rim portion of the cover according to a first embodiment.
Figure 5:
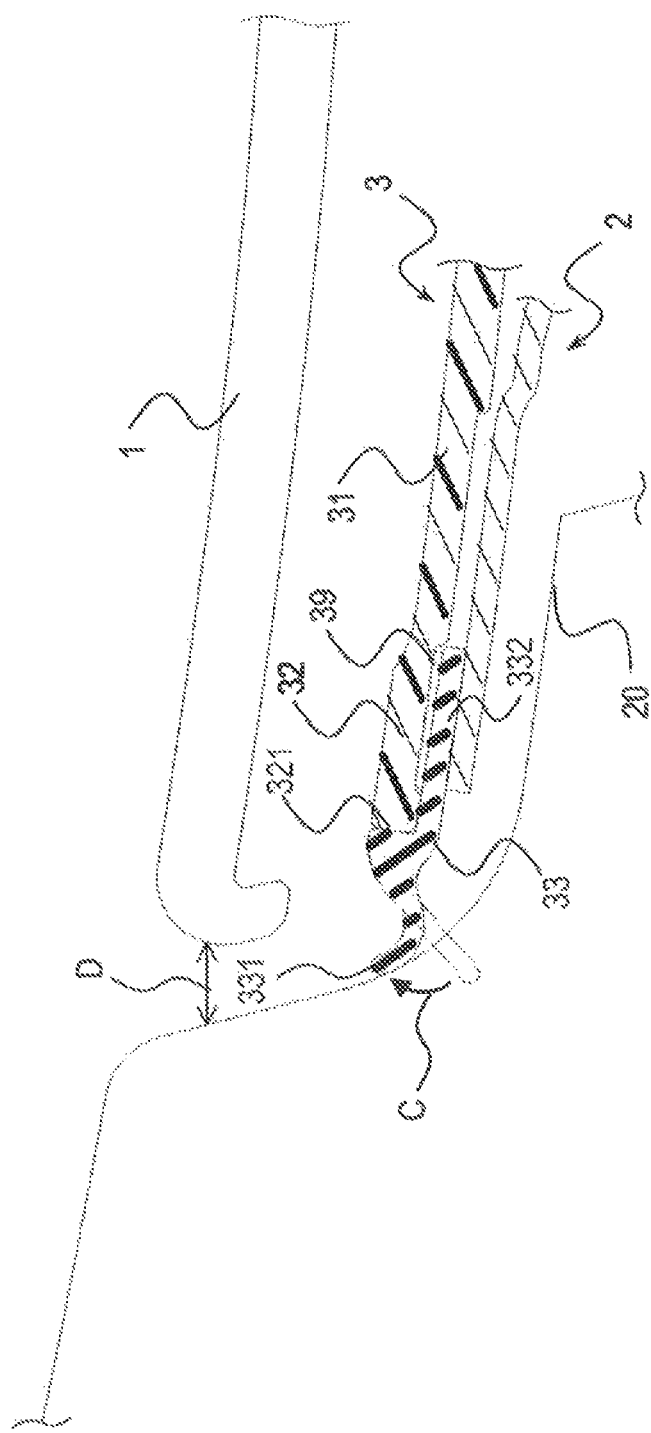
FIG. 5 is a cross-sectional view schematically illustrating a flex of the circumferential rim portion according to the first embodiment.

Next, a circumferential rim portion 33 of the cover 3 will be explained with reference to FIGS. 4 and 5. FIG. 4 is a perspective view schematically illustrating a state where the body portion 31 and the circumferential rim portion 33 of the cover 3 are separated from each other. FIG. 5 is a cross-sectional view schematically illustrating the front side of the circumferential portion 33 along a direction orthogonal to the longitudinal direction (the vehicle width direction) in a state where the movable spoiler 1 is in the retracted state.

As shown in FIG. 4, the cover 3 includes the flexible circumferential rim portion 33 that is made of, for example, rubber. As shown in FIG. 5, the circumferential rim portion 33 is mounted to a lower surface of the circumferential rim end 32 of the body portion 31 via a mounting part 332 with a bonding means 39, for example, a double-sided tape or an adhesive material. Accordingly, the mounting part 332 is positioned between the circumferential rim end 32 of the body portion 31 and a circumferential rim end of the frame 2. The circumferential rim portion 33 is formed in a substantially ring shape so as to surround an outer circumference of the body portion 31, the substantially ring shape that is similar to an external shape of the frame 2.

The cover 3 including the circumferential rim portion 33 is fixed to the frame 2 that is fixed to the rear of the body (the housing portion 20) by tapping or by screwing. A distal end portion 331 of the circumferential rim portion 33 shown in a dotted line in FIG. 5, the distal end portion 331 before being mounted to the frame 2, is formed to be tilted or inclined in a direction toward the frame 2, that is, tilted or inclined downwardly. The respective external dimensions of the body portion 31 and the circumferential rim portion 33 are set larger than the external dimension of the frame 2. The circumferential rim portion 33 is mounted to the body portion 31 so as to be in contact with an end surface 321 of the circumferential rim end 32 of the body portion 31. When the cover 3 is mounted on the frame 2, the distal end portion 331 of the circumferential rim portion 33 protrudes from the circumferential rim end 32 of the body portion 31 of the cover 3 at the circumference of the frame 2.

Therefore, the flexible circumferential rim portion 33 comes in contact with the body of the vehicle 100 during the mounting of the cover 3 to the frame 2, and bends and flexes upwardly in a direction shown with an arrow C in FIG. 5. The cover 3 is mounted to the frame 2 in a state where the circumferential rim portion 33 is flexed. Accordingly, because the circumferential rim portion 33 covers a gap between the frame 2 and the body of the vehicle 100, the circumferential rim portion 33 prevents extraneous materials, for example, liquid from entering. Specifically, as shown in FIG. 5, in a case where the circumferential rim portion 33 protrudes to a position that corresponds to a gap D between the movable spoiler 1 and the body of the vehicle 100, the entrance of the extraneous materials from the gap D may be efficiently prevented.

According to the spoiler unit 10 of the first embodiment, because, for example, the bolt holes of the frame 2 are covered with the cover 3, the bolt holes may not be exposed to the outside in a case where the movable spoiler 1 moves to the deployed position or in a case where the movable spoiler 1 is in the deployed state. Thus, the entrance of the extraneous materials may be prevented and the designability of the vehicle 100 is enhanced. In addition, the gap between the body and the frame 2 of the vehicle 100 can be covered by the mounting of the cover 3 that includes the circumferential rim portion 33. Accordingly, the liquid tightness is enhanced and the entrance of the extraneous materials is prevented. Because the shape of the cover 3 is designed to fit the shape of the vehicle 100, the vehicle 100 may have an uniformed design.

A spoiler unit 110 of a second embodiment will be explained with reference to FIGS. 6 and 7. In FIG. 7, a separation portion 234 is illustrated with a dotted line. The differences from the first embodiment will be explained and the same components as those described in the first embodiment are marked with the same reference numerals, and descriptions of the components will not be repeated. The components having the same reference numerals perform substantially the same operation and function, and the function effect is substantially the same unless otherwise particularly explained.

Figure 6:
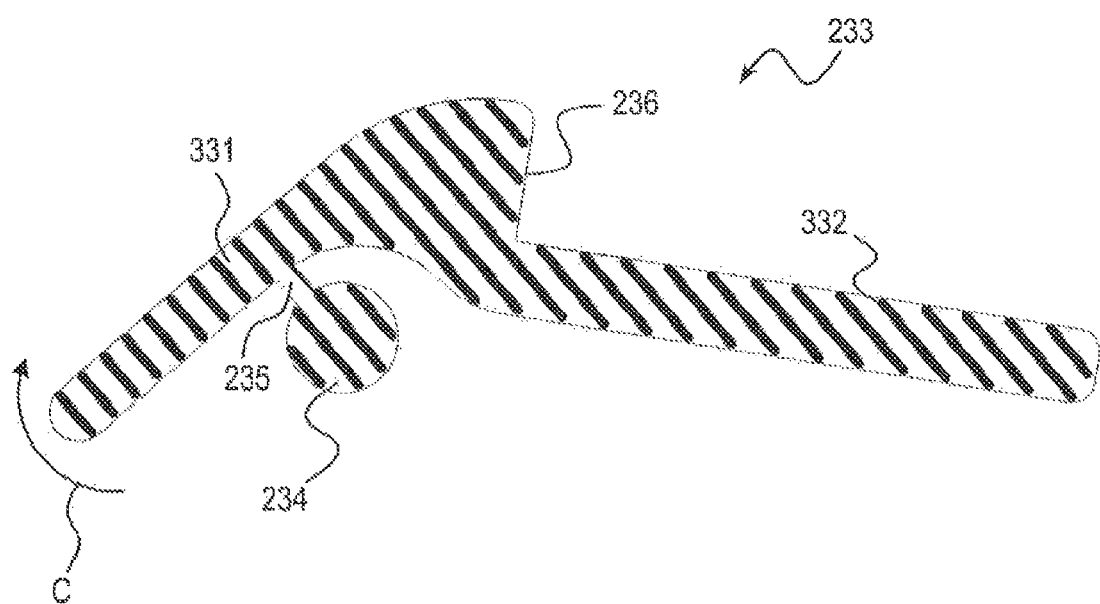
FIG. 6 is a cross-sectional view schematically illustrating a circumferential rim portion according to a second embodiment.
Figure 7:
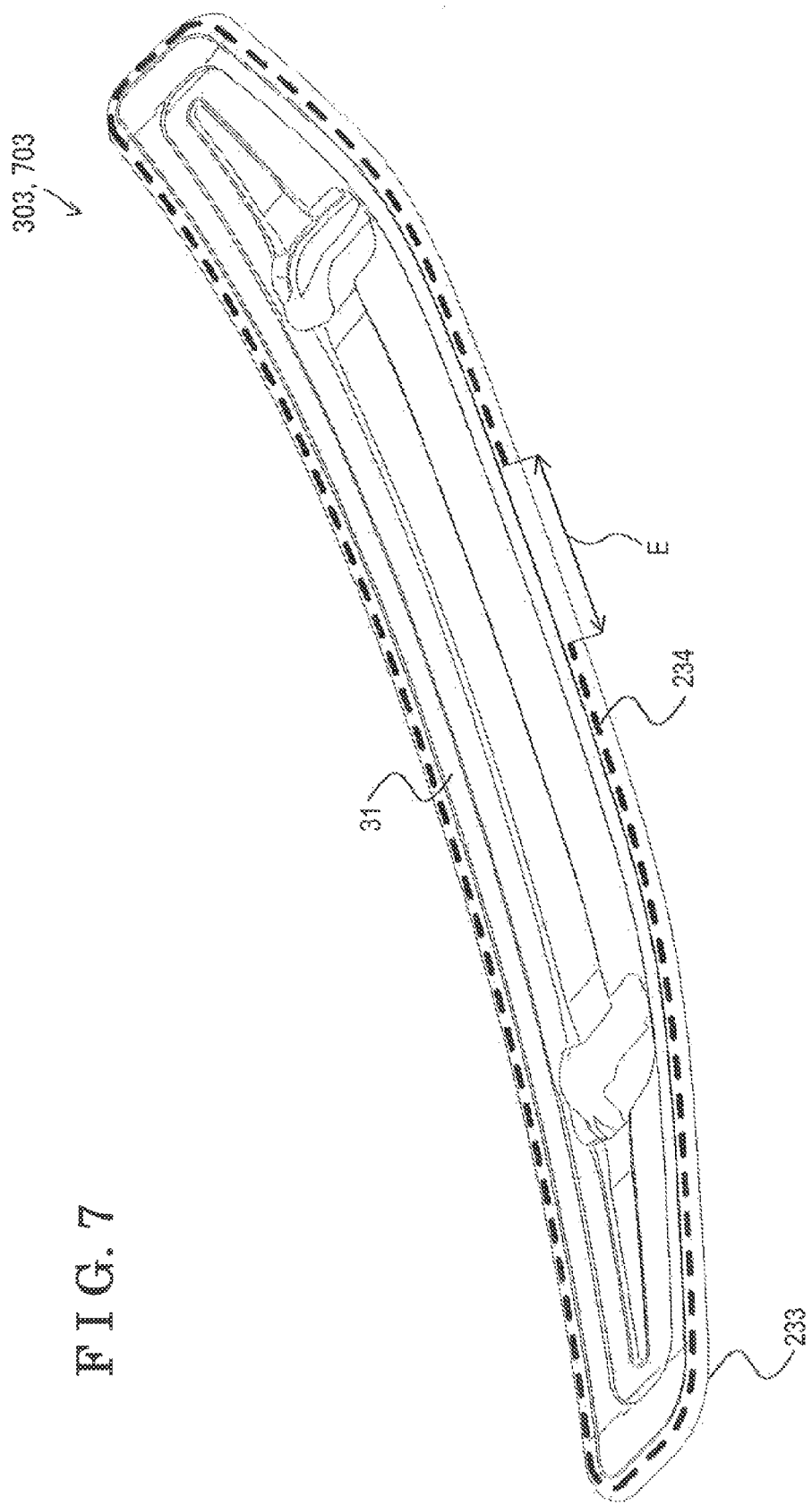
FIG. 7 is a perspective view schematically explaining a position of a separation portion according to the second embodiment.

According to the spoiler unit 110 of the second embodiment, as shown in FIG. 6, a circumferential rim portion 233 of a cover 303 includes the string-shaped separation portion 234 that is connected to a lower surface of the distal end portion 331. The separation portion 234 is connected to the lower surface of the circumferential rim portion 233 via a weakened portion 235. The separation portion 234 is positioned between a contact portion 236 of the circumferential rim portion 233 that is in contact with the end surface 321 of the cover 303 and an outer end portion of the distal end portion 331 and is connected to the circumferential rim portion 233. The separation portion 234 is positioned outwardly relative to the circumferential rim end of the frame 2.

The weakened portion 235 connecting the separation portion 234 and the circumferential rim portion 233 is integrally formed with the separation portion 234 and is formed so as to be cut off easily. That is, the weakened portion 235 has a thickness that is thinner than the thickness of the separation portion 234. Therefore, the weakened portion 235 is cut off when the operator holds and pulls up the separation portion 234. Accordingly, the separation portion 234 is separated from the circumferential rim portion 233. At this time, the operator pulls up the separation portion 234 and the distal end portion 331 of the circumferential rim portion 233 simultaneously. Thus, the flexible circumferential rim portion 233 bends and flexes upwardly in a direction shown with the arrow C in FIG. 6. The flexed distal end portion 331 of the circumferential rim portion 233 comes in contact with the body of the vehicle 100. Thus, the gap between the body and the frame 2 of the vehicle 100 may be covered securely.

As shown in a dotted line in FIG. 7, the separation portion 234 is formed in a substantially frame shape so as to surround an outer circumference of the frame 2. The separation portion 234 is provided with a separation area E that is defined between a first end portion of the separation portion 234 and a second end portion of the separation portion 234, the second end portion facing the first end portion. A part of the separation portion 234 is defined as the separation E that corresponds to be a void. The separation area E is favorably provided at a portion of the separation portion 234, the portion positioned at the rear of the vehicle 100. That is, the separation portion 234 other than the portion positioned at the rear of the vehicle 100 is favorably formed in a continuous shape. Accordingly, the separation portion 234 is continuously pulled up when the operator holds and pulls the separation portion 234 that is positioned close to the separation area E. Thus, the whole portion of the separation portion 234 is easily separated from the circumferential rim portion 233.

The separation area E is favorably provided at a center portion of the separation portion 234 in the vehicle width direction and at the portion of the separation portion 234, the portion positioned at the rear of the vehicle 100. Because the separation area E is provided at the center portion of the separation portion 234 in the vehicle width direction and at the portion of the separation portion 234, the portion positioned at the rear of the vehicle 100, the operator can easily hold the separation portion 234 by inserting his/her hand below the cover 303 from the rear of the vehicle 100. Thus, the operability of the mounting of the cover 303 is enhanced when manufacturing the spoiler unit 110.

The manufacturing (mounting) of the spoiler unit 110 will be explained below. First, the movable spoiler 1 for the vehicle 100 and the frame 2 for fixing the movable spoiler 1 to the vehicle 100 are prepared. The cover 303 that includes the flexible circumferential rim portion 233 and that is connected to the separation portion 234 at the lower surface of the circumferential rim portion 233 via the weakened portion 235 is prepared. After the mounting of the frame 2 to the vehicle 100, the cover 303 is mounted on the frame 2. Then, the operator inserts his/her hand below the cover 303 and holds the separation portion 234. The operator separates the separation portion 234 from the circumferential rim portion 233 while pulling up the separation portion 234 along an outer circumference of the cover 303. Accordingly, the distal end portion 331 of the circumferential rim portion 233 is flexed upwardly.

According to the spoiler unit 110 of the second embodiment, because, for example, the bolt holes of the frame 2 are covered with the cover 303, the bolt holes may not be exposed to the outside when the movable spoiler 1 moves to the deployed position or in a case where the movable spoiler 1 is in the deployed state. Thus, the entrance of the external materials may be prevented and the designability of the vehicle 100 is enhanced. In addition, the gap between the body and the frame 2 of the vehicle 100 can be covered by the mounting of the cover 303 that includes the circumferential rim portion 233. Accordingly, the liquid tightness is enhanced and the entrance of the extraneous materials is prevented. Because the separation portion 234 is provided at the circumferential rim portion 233, the manufacturing (the mounting) of the spoiler unit 110 is easily performed.

The weakened portion 235 may be provided with, for example, a slit portion or a notch portion instead of the thin-thickness portion. Alternatively, the weakened portion 235 may be made from a material that is cut easier than the material of the circumferential rim portion 233.

The aforementioned embodiments and modified examples may be combined desirably as long as the combination does not depart from the spirit of the present disclosure. For example, the circumferential rim portion 33, 233 may be mounted to an upper surface or a distal end surface of the circumferential rim end 32 of the body portion 31.

Figure 8:
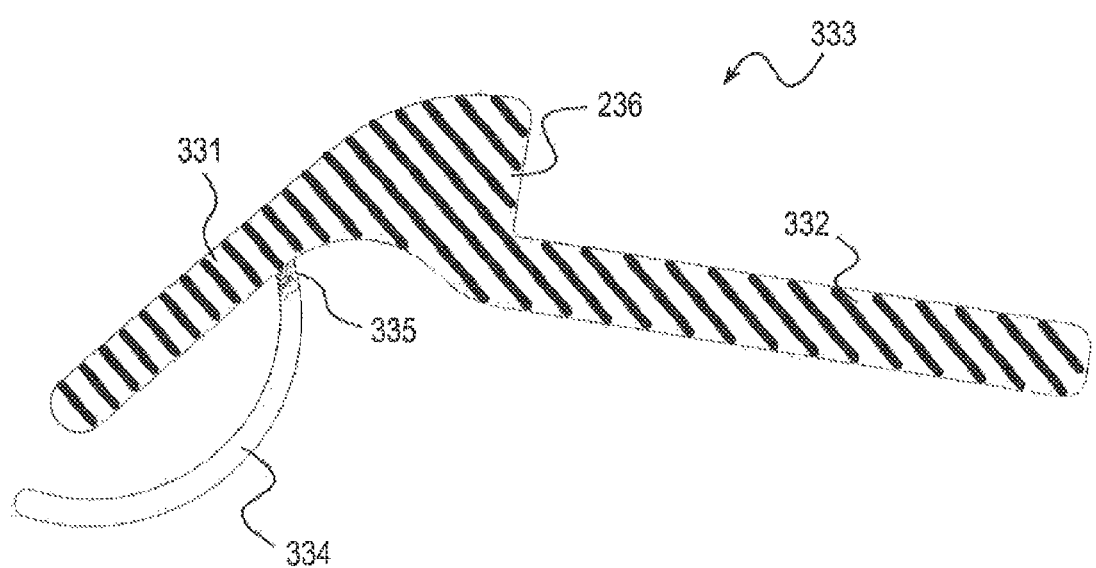
FIG. 8 is a cross-sectional view schematically illustrating a modified example of the second embodiment.

The separation portion is not limited to be formed in a string shape and can be connected to the circumferential rim portion with, for example, an adhesive material. As shown in FIG. 8, according to a modified example of the second embodiment, a circumferential rim portion 333 of a cover 703 includes the distal end portion 331 and a separation portion 334. The separation portion 334 is formed in a sheet-shape and is connected to the distal end portion 331. The separation portion 334 is connected to the distal end portion 331 at the lower surface of the distal end portion 331 with an adhesive means 335.

The separation portion 334 is adhered to the distal end portion 331 so as to protrude an end portion of the separation portion 334 outwardly relative to the distal end portion 331 of the circumferential portion 333. Therefore, the separation portion 334 is removed and separated from the circumferential rim portion 333 by the holding and the pulling up of the separation portion 334 by the operator. At this time, the operator pulls the separation portion 334 and the distal end portion 331 of the circumferential rim portion 333 simultaneously. Thus, the flexible circumferential rim portion 333 bends and flexes upwardly. The flexed distal end portion 331 of the circumferential rim portion 333 comes in contact with the body of the vehicle 100.

Meanwhile, the separation portion 334 of the modified example is formed in a substantially frame shape so as to surround the outer circumference of the frame 2. The separation area E of the separation portion 334 is favorably provided at the portion of the separation portion 334, the portion positioned at the rear of the vehicle 100. The separation area E is favorably provided at a center portion of the separation portion 334 in the vehicle width direction.

Figure 9A:
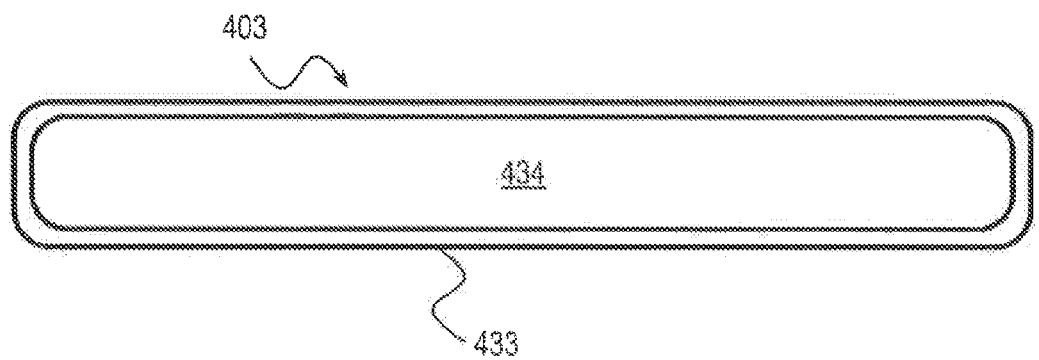
FIG. 9A is a plan view schematically illustrating a modified example of the cover.
Figure 9B:
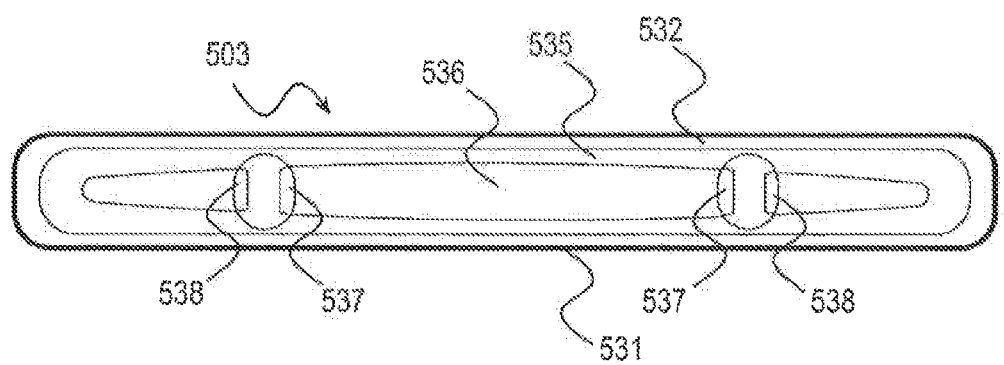
FIG. 9B is a plan view schematically illustrating another modified example of the cover.
Figure 9C:
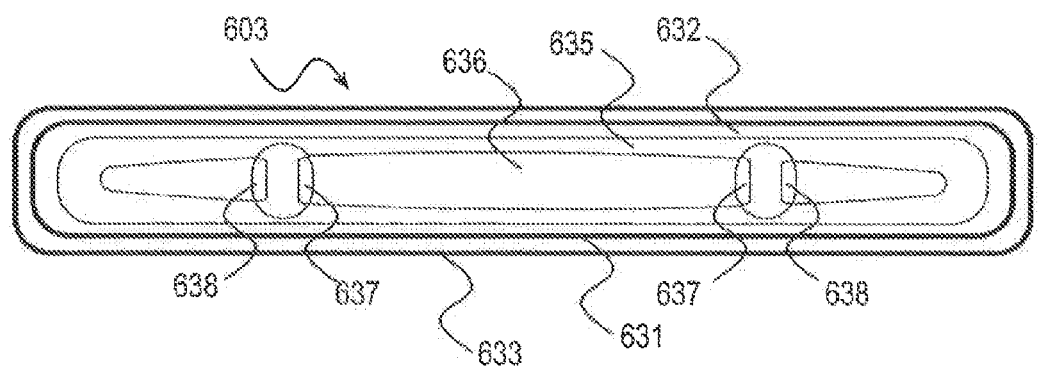
FIG. 9C is a plan view schematically illustrating still further modified example of the cover.

The cover may include various shapes as shown in FIGS. 9A, 9B and 9C that illustrate modified examples of the first and second embodiments. FIGS. 9A, 9B and 9C show top views schematically illustrating covers 403, 503, 603 according to the modified examples of the first and second embodiments.

According to the modified example shown in FIG. 9A, the cover 403 does not include the body portion 31 and is provided with a circumferential rim portion 433 only. An opening portion 434 is provided at an inner portion of the circumferential end portion 433. The cover 403 is mounted to the frame 2 so as to protrude an outer end portion of the circumferential rim portion 433 outwardly relative to the frame 2. Thus, the cover 403 that is mounted on the frame 2 covers the gap between the body and the frame 2 of the vehicle 100. Accordingly, the liquid tightness is enhanced and the entrance of the extraneous materials is prevented.

According to another modified example shown in FIG. 9B, the cover 503 does not include the circumferential rim portion 33 and is configured with a body portion 531 only. The cover 503 is provided with a first step portion 535 extending in the longitudinal direction along a circumferential rim end 532 of the body portion 531. The cover 503 is further provided with a second step portion 536 being positioned at an inner side of the first step portion 535 and extending in the longitudinal direction. The second step portion 536 is formed in a substantial quadrilateral shape. The first step portion 535 is formed in a shape that surrounds the second step portion 536. The first step portion 535 is provided at a position lower than the circumferential rim end 532. The second step portion 536 is provided at a position lower than the first step portion 535.

The cover 503 includes an internal extended portion 537 (i.e., serving as an extended portion) and an external extended portion 538 (i.e., serving as an extended portion). The internal extended portion 537 extends to an inner side of the recessed portion 22 of the frame 2. The external extended portion 538 faces the internal extended portion 537 and extends downwardly. The internal and external extended portions 537, 538 are inserted into the recessed portion 22 of the frame 2 when the cover 503 is mounted to the frame 2. The internal and external extended portions 537, 538 are formed so as to be positioned on a border portion of the first and second step portions 535, 536. According to the spoiler unit 10, 110 including the cover 503, for example, the bolt holes, are not exposed to the outside by the cover 503 that is mounted on the frame 2. Thus, the entrance of the external materials may be prevented and the designability of the vehicle 100 is enhanced.

According to still further modified example shown in FIG. 9C, a body portion 631 and a circumferential rim portion 633 of the cover 603 are integrally formed. The circumferential rim portion 633 is continuously provided from the body portion 631. According to the cover 603, the body portion 631 and the circumferential rim portion 633 are made from a material, for example, rubber, and are integrally formed. In such a case, the body portion 631 is made from a material that has flexibility. Alternatively, according to the third modified example shown in FIG. 9C, the body portion 631 and the circumferential rim portion 633 can be integrally formed by a means of two-color molding. In such a case, the body portion 631 is made from a material that has stiffness or rigidity. The circumferential rim portion 633 is made from a material that has flexibility.

The cover 603 includes a first step portion 635, a second step portion 636, an internal extended portion 637 (i.e., serving as an extended portion) and an external extended portion 638 (i.e., serving as an extended portion). The first step portion 635 extends in the longitudinal direction along a circumferential rim end 632 of the body portion 631. The second step portion 636 is positioned at an inner side of the first step portion 635 and extends in the longitudinal direction. The internal extended portion 637 extends to an inner side of the recessed portion 22 of the frame 2. The external extended portion 638 faces the internal extended portion 637 and extends downwardly. According to the spoiler unit 10 including the cover 603, for example, the bolt holes are not exposed to the outside by the cover 603 that is mounted on the frame 2. Thus, the entrance of the external materials may be prevented and the designability of the vehicle 100 is enhanced.

According to the aforementioned embodiment, the spoiler unit (10, 110) includes the movable spoiler (1) for the vehicle (100), the frame (2) fixing the movable spoiler (1) to the vehicle (100), and the cover (3, 303, 403, 503, 603, 703) being mounted on the frame (2).

According to the aforementioned construction, the entrance of the extraneous materials into the inner side of the frame 2 may be prevented.

The frame (2) includes the recessed portion (22). The cover (3, 303, 503, 603, 703) includes the body portion (31, 531, 631). The body portion (31, 531, 631) includes the extended portion (the internal extended portion 37, the external extended portion 38, the internal extended portion 537, the external extended portion 538, the internal extended portion 637, the external extended portion 638) extending to the inner side of the recessed portion (22).

According to the aforementioned construction, because the size of the opening portion formed at the body portion 31, 531, 631 of the cover 3, 303, 503, 603, 703 is reduced, the operator can be prevented from inserting, for example, his/her finger into the opening portion by mistake.

The cover (3, 303, 503, 603, 703) includes the body portion (31, 531, 631). The cover (3, 303, 503, 603, 703) includes the first step portion (35, 535, 635) provided at the inner side of the circumferential rim end (32, 532, 632) of the body portion (31, 531, 631), the first step portion (35, 535, 635) extending along the circumferential rim end (32, 532, 632). The cover (3, 303, 503, 603, 703) includes the second step portion (36, 536, 636) provided at the inner side of the first step portion (35, 535, 635).

According to the aforementioned construction, because the cover 3, 303, 503, 603, 703 includes the first and second step portions 35, 535, 635, the stiffness or the rigidity of the cover 3, 303, 503, 603, 703 is enhanced.

According to the aforementioned embodiment, the cover (3, 303, 703) includes the circumferential rim portion (33, 233, 333) being mounted to the body portion (31, 631), the circumferential rim portion (33, 233, 333) having flexibility.

According to the aforementioned construction, because the circumferential rim portion 33, 233, 333 covers the gap between the frame 2 and the body of the vehicle 100, the circumferential rim portion 33, 233, 333 prevents extraneous materials, for example, liquid from entering.

According to the aforementioned embodiment, the cover (3, 303, 403, 603) includes the circumferential rim portion (33, 233, 333, 433, 633) having flexibility.

According to the aforementioned construction, because the circumferential rim portion 33, 233, 333, 433, 633 covers the gap between the frame 2 and the body of the vehicle 100, the circumferential rim portion 33, 233, 333, 433, 633 prevents extraneous materials, for example, liquid from entering.

According to the aforementioned embodiment, the circumferential rim portion (233, 333) includes the separation portion (234, 334) being connected to the lower surface of the circumferential rim portion (233, 333).

According to the aforementioned construction, the separation portion 234, 334 is continuously pulled up when the operator holds and pulls the separation portion 234, 334 that is positioned close to the separation area E. Thus, the whole portion of the separation portion 234, 334 is easily separated from the circumferential rim portion 233, 333.

According to the aforementioned embodiment, the separation portion (234, 334) is provided with a separation area (E) being defined between the first end portion of the separation portion (234, 334) and the second end portion of the separation portion (234, 334), the second end portion facing the first end portion. The separation area (E) is provided at a portion of the separation portion (234, 334), the portion positioned at a rear of the vehicle (100).

According to the aforementioned construction, the operator can easily hold the separation portion 234, 334 by inserting his/her hand below the cover 303 from the rear of the vehicle 100. Thus, the operability of the mounting of the cover 303 is enhanced when manufacturing the spoiler unit 110.

According to the aforementioned embodiment, the separation area (E) is defined at the center portion of the separation portion (234, 334) in the vehicle width direction.

According to the aforementioned construction, because the separation area E is provided at the center portion of the separation portion 234, 334 in the vehicle width direction and at the portion of the separation portion 234, 334, the portion positioned at the rear of the vehicle 100, the operator can easily hold the separation portion 234, 334 by inserting his/her hand below the cover 303 from the rear of the vehicle 100. Thus, the operability of the mounting of the cover 303 is enhanced when manufacturing the spoiler unit 110.

According to the aforementioned embodiment, the manufacturing method of the spoiler unit (110), the spoiler unit (110) including the movable spoiler (1) for the vehicle (100) and the frame (2) fixing the movable spoiler (1) to the vehicle (100) includes steps of preparing the cover (303, 703) that includes the circumferential rim portion (233, 333), the circumferential rim portion (233, 333) having flexibility, the cover (303, 703) including the separation portion (234, 334) being connected to the lower surface of the circumferential rim portion (233, 333), mounting the cover (303, 703) on the frame (2), and flexing the circumferential rim portion (233, 333) upwardly by separating the separation portion (234, 334) from the circumferential rim portion (233, 333) while pulling up the separation portion (234, 334) along the outer circumference of the cover (303, 703).

According to the aforementioned manufacturing method of the spoiler unit 110, the spoiler unit 110 including the cover 303, 703 can be easily manufactured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spoiler unit, comprising:
a movable spoiler for a vehicle;
a frame fixing the movable spoiler to the vehicle; and
a cover being mounted on the frame, wherein
the cover includes a body portion;

the cover includes a first step portion provided at an inner side of a circumferential rim end of the body portion, the first step portion extending along the circumferential rim end; and the cover includes a second step portion provide at an inner side of the first step portion.

2. The spoiler unit according to claim 1, wherein the frame includes a recessed portion;

the cover includes a body portion; and the body portion includes an extended portion extending to an inner side of the recessed portion.

3. The spoiler unit according to claim 2, wherein the cover includes a circumferential rim portion being mounted to the body portion, the circumferential rim portion having flexibility.

4. The spoiler unit according to claim 1, wherein the cover includes a circumferential rim portion having flexibility.

5. The spoiler unit according to claim 3, wherein the circumferential rim portion includes a separation portion being connected to a lower surface of the circumferential rim portion.

6. The spoiler unit according to claim 5, wherein the separation portion is provided with a separation area being defined between a first end portion of the separation portion and a second end portion of the separation portion, the second end portion facing the first end portion; and the separation area is provided at a portion of the separation portion, the portion positioned at a rear of the vehicle.

7. The spoiler unit according to claim 6, wherein the separation area is defined at a center portion of the separation portion in a vehicle width direction.

8. A manufacturing method of a spoiler unit, the spoiler unit including a movable spoiler for a vehicle and a frame fixing the movable spoiler to the vehicle; comprising steps of:

preparing a cover that includes a circumferential rim portion, the circumferential rim portion having flexibility, the corer including a separation portion being connected to a lower surface of the circumferential rim portion;

mounting the cover on the frame; and flexing the circumferential rim portion upwardly by separating the separation portion from the circumferential rim portion while pulling up the separation portion along an outer circumference of the cover.

* * * * *